United States Patent [19]

Jinnai et al.

[11] Patent Number: 4,857,419

[45] Date of Patent: Aug. 15, 1989

[54] METHOD OF OPERATING ZINC-HALOGEN SECONDARY BATTERY

[75] Inventors: Kenichiro Jinnai, Higashimine; Takafumi Hashimoto, Asahi, both of Japan

[73] Assignee: Kabushiki Kaisha Meidensha, Tokyo, Japan

[21] Appl. No.: 144,749

[22] Filed: Jan. 19, 1988

Related U.S. Application Data

[63] Continuation of Ser. No. 874,448, Jun. 16, 1986, abandoned.

[30] Foreign Application Priority Data

Jun. 19, 1985 [JP] Japan .................................. 60-131995

[51] Int. Cl.[4] ...................... H01M 8/00; H01M 10/44
[52] U.S. Cl. .......................................... 429/13; 429/3; 429/17; 429/27; 320/14; 320/21; 320/25
[58] Field of Search .................. 429/3, 13, 17, 27, 229; 320/14, 21, 25-27

[56] References Cited

U.S. PATENT DOCUMENTS

| | | | |
|---|---|---|---|
| 3,556,849 | 1/1971 | Oswin et al. | 429/13 |
| 3,597,673 | 8/1971 | Burkett et al. | 320/14 X |
| 3,609,503 | 9/1971 | Burkett et al. | 320/14 X |
| 3,683,256 | 8/1972 | Mas | 320/14 |
| 3,732,481 | 5/1973 | Mas | 320/14 |
| 4,152,224 | 5/1979 | Klein et al. | 429/206 X |
| 4,343,868 | 8/1982 | Putt | 429/17 |

Primary Examiner—Stephen J. Kalafut
Attorney, Agent, or Firm—Bachman & LaPointe

[57] ABSTRACT

In recharging a zinc-halogen secondary battery or battery, zinc dendrite is readily formed on the negative electrode and therefore it has been difficult to form a uniformly thick zinc layer on the negative electrode. This inevitably causes a short cyclic battery lifetime. To overcome this problem, electric pulse treatment is effected at the electrode before dc battery recharging process. In zinc oxide resolving treatment, an electrically positive pulse is applied to the negative electrode. In zinc fine crystal depositing treatment, an electrically negative pulse is applied to the negative electrode. Where the above pulse treatments are effected in combination in the electrolyte including a zinc dendrite inhibitor, a synergistic effect can be obtained.

12 Claims, 4 Drawing Sheets

FIG. I
(PRIOR ART)

(IN CHARGE)

$Zn^{++} + 2\bar{e} \rightarrow Zn \qquad 2Br^- \rightarrow Br_2 + 2\bar{e} \qquad ZnBr_2 \rightarrow Zn + Br_2$

DEPOSITING PULSE

RESOLVING PULSE

ALTERNATING PULSE

4,857,419

METHOD OF OPERATING ZINC-HALOGEN SECONDARY BATTERY

This is a continuation of co-pending application Ser. No. 874,448 filed on June 16, 1986 abandoned.

BACKGROUND OF THE INVENTION

1. Field of the Invention

The present invention relates generally to a method of operating a zinc-halogen secondary battery and more specifically to a method of operating the battery by which it is possible to effectively inhibit zinc dendrite from being formed on a negative electrode thereof in recharging the battery.

2. Description of the Prior Art

In the zinc-halogen secondary battery, the growth of zinc dendrite on the negative electrode has well been known as a serious probelem. This is because, once zinc is electrodeposited on the surface of the negative electrode in dendrite fashion in recharging the battery after the battery has been discharged, the cyclic lifetime of the battery is markedly reduced. In more detail, after the battery has been discharged, porous oxide such as $ZnO_x$, $Zn(OH)_x$ is readily produced on the residual zinc layer on the negative electrode. Once these porous zinc oxide is formed theron, the electrodeposited zinc grows into coarse zinc crystal of less adhesion when the battery is being recharged, and finally dendrite is produced on the negative electrode. In the case where zinc dendrite is formed on the electrode, it is impossible to effectively form a uniformly thich electrodeposited zinc layer on the negative electrode, so that the cyclic battery lifetime is markedly reduced.

To overcome these problems, so far various zinc dendrite inhibitors have been developed to prevent zinc dendrite from being formed on the negative electrode or to improve the cyclic lifetime of the battery. However, these zinc dendrite inhibitors are not yet satisfactory.

SUMMARY OF THE INVENTION

With these provlems in mind, therefore, it is the primary object of the present invention to provide a method of operating a zinc-halogen secondary battery by which it is possible to effectively prevent zinc dendrite from being formed on the negative electrode of the battery. In other words, in the method according the present invention, the cyclic lifetime of the secondary battery can be improved markedly due to the absence of zinc dendrite.

To achieve the above-mentioned object, the method of operating a zinc-halogen secondary battery according to the present invention is characterized in that an electric pulse treatment is effected to the secondary battery before recharging the battery.

The electric pulse treatment is to apply a fine zinc crystal electrodepositing pulse (electrically negative pulse) to the negative eletrode of the battery or a zinc oxide resolving pulse (electrically positive pulse) to the negative electrode thereof or both the zinc crystal electrodepositing electric pulse and the zinc oxide resolving electric pulse in combination. The electric pulse current is 80 mA/cm² or more in current density and from 10 to 25 in off-to-on time ratio. When only the zinc crystal electrodepositing pulse is applied, the pulse is passed for 30 to 60 minutes. When only the zinc oxide resolving pulse is applied, the pulse is passed for 5 to 10 minutes. When both the pulses are applied in combination, the zinc oxide resolving pulse is first applied for 5 to 10 minutes and then the zinc crystal electrodepositing pulse is applied for 30 to 60 minutes.

The above-mentioned electric pulse treatment is more effective when effected within an electrolyte including a zinc dendrite inhibitor essentially consisting of $PbBr_2$, $SnBr_2$ and quaternary ammonium salt or $TλBr_2$, $InBr_2$ and quaternary ammonium salt. This is because there occurs a synergistic effect between the zinc dendrite inhibitor and the electric pulse treatment according to the present invention.

After the surface conditions of the negative electrode has been improved uniform after discharge by the electric pulse treatment of the present invention, the battery is recharged by a dc voltage to form a uniformly thick electrodeposited zinc layer on the negative electrode.

BRIEF DESCRIPTION OF THE DRAWINGS

The features and advantages of the method of operating a zinc-halogen secondary battery according to the present invention over the conventional method will be more clearly appreciated from the following description of the preferred embodiments of the invention taken in conjunction with the accompanying drawings and in which.

DETAILED DESCRIPTION OF THE PREFERRED EMBODIMENTS

Figure 1:
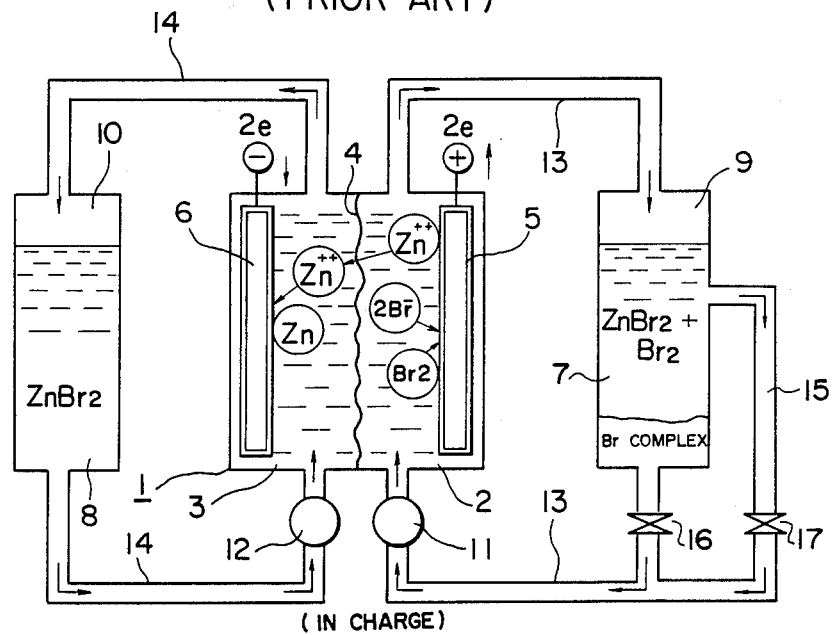
FIG. 1 is a diagrammatical cross-sectional view of a conventioanl zinc-bromine secondary battery for assistance in explaning the structure of the secondary battery.

To facilitate understanding of the present invention, a brief reference will be made to a well-known zinc-halogen secondary battery. FIG. 1 shows a zinc-bromine secondary battery having a unit cell. In the drawing, the reference numeral 1 denotes a unit battery; the numeral 2 denotes a positive electrode chamber; the numeral 3 denotes a negative electrode chamber; the numeral 4 denotes an ion-permeable electrolyte-impermeable separator (diaphragm) for separating the postive electrode chamber 2 from the negative electrode chamber 3 or vice versa; the numeral 5 denotes a positive electrode; the numeral 6 denotes a negative electrode; the numeral 7 denotes a positive electrolyte; the numeral 8 denotes a negative eletrolyte. Each of these electrolytes 7 and 8 is put in each of two positive and negative electrolyte tanks 9 and 10. The reference numerals 11 and 12 denote pumps arranged in an electrolyte circulation pipe system 13 between the positive electrode chamber 2 and the positive electrolyte tank 9 and in an electrolyte circulation pipe system 14 between the negative electrode chamber 3 and the negative electrolyte tank 10, respectively. The numeral 15 denotes a positive electrolyte bypass pipe system, and the numerals 16 and 17 denote valves.

In the above-mentioned battery structure, when the battery is charged with the valve 16 closed and the valve 17 open, the two pumps 11 and 12 are driven to circulate both the electrolytes 7 and 8 through both the electrolyte circulation pipe systems 13, 14 and 15 in the directions as shown by the arrows, respectively. Therefore, a reaction of $Zn^{++}+2e^- \rightarrow Zn$ is produced at the negative electrode 6, and a reaction of $2Br^- \rightarrow Br_2 + 2e^-$ is produced at the positive electrode 5. The bromine produced at the positive electrode 5 is mixed with the positive electrolyte 7 in the form of molecule. A part of the molecule is resolved into the positive electrolyte 7 and the major part of the molecule is precipitated and accumulated in the positive electrolyte tank 9 in the form of bromine complex due to a complexing agent included in the positive electrolyte 7. On the other hand, zinc electrodeposited at the negative electrode 6 is accumulated as it is onto the negative electrode 6.

When the battery is discharged with thge valve 16 open and the valve 17 closed, reactions opposite to the above-mentioned reaction formulas are produced at each electrode 5 or 6 under the condition that the electrolytes are circulated in the directions shown by the arrows and the above deposition substances (Zn, Br$_2$) are consumed (oxidized or reduced) at each electrode 5 or 6 to generate electrical energy.

In the above description, the secondary battery having a single cell has been explained for facilitating understanding of the structure of the secondary battery. However, in plactice, a plurality of secondary cells are stacked in series to form a battery according to a voltage required.

In the above-mentioned zinc-halogen secondary battery, the growth of zinc dendrite (branched crystal) at the negative electrode has been known as a serious problem. Once the battery has been discharged, porous zinc oxides such as ZnO$_x$, Zn(OH)$_x$, etc. appear on the surface of the residual zinc on the negative electrode, so that when zinc is electrodeposited thereupon by a dc current for recharging the battery, coarse zinc crystal of less adhesion will be formed on the porous zinc oxides and thereby zinc dendrite will be formed ultimately. Once the dendrite is formed on the negative electrode, since a uniformly deposited zinc layer will not be formed in recharging the battery by a dc current, the cyclic lifetime of the battery will be reduced markedly.

To solve the above-mentioned problems, various zinc dendrite inhibitors have been so far developed to increase the cyclic lifetime of the battery. However, these actions have not yet been satisfactory.

In view of the above description, reference is now made to the embodiments of the method of operating a secondary battery according to the present invention. The battery used for the embodiments is a circular type zinc-bromine secondary battery as shown in FIG. 1.

1st Embodiment:

The battery operating conditions are as follows:

The electrolyte includes 3 mol/$\lambda$ ZnBr$_2$, 1 mol/$\lambda$ bromine complexing agent consisting of quarternary ammonium bromide, 2 mol/$\lambda$ NH$_4$Cl supporting electrolyte, and $10^{-4}$ mol/$\lambda$ PbBr$_2$ zinc dendrite inhibitor. The battery is charged for three hours, discharged for two hours and then recharged for two hours. The discharging and/or recharging dc current density is 40 mA/cm$^2$.

In the present invention, electric pulse treatment is effected after discharge but before recharging the battery by a dc source. The pulse treatment can be divided into four methods as follows: (1) fine zinc crystal electrodepositing pulse (electrically negative pulse); (2) zinc oxide resolving pulse (electrically positive pulse); (3) zinc oxide resolving pulse and fine crystal electrodepositing pulse in combination; and (4) alternating pulse.

Figure 2:
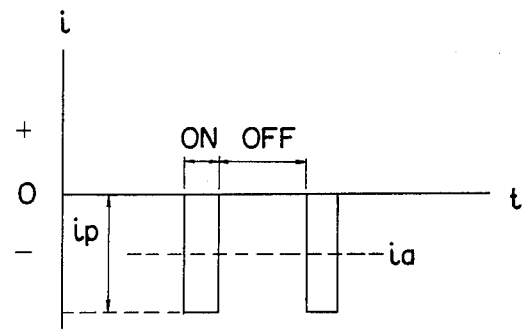
FIG. 2 is a graphical representation for assistance in explaining an electric pulse waveform.

The above four electric pulse treatments will be described hereinbelow in order. Prior to the detailed description the symbol $i_p$ denotes a peak current density; $i_a$ denotes an average current density; ON denotes a pulse on-time duration; and OFF denotes a pulse off-time duration, all as depicted in FIG. 2.

Figure 3A:
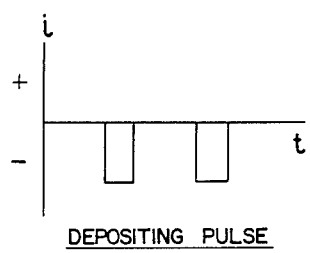
FIG. 3(A) is a graphical representation for assistance in explaning a fine zinc crystal electrodepositing pulse (electrically negative pulse) adopted in the method according to the present invention.

(1) zinc fine crystal electrodepositing pulse:

This pulse is effective in electrodepositing zinc on the negative electrode in the form of fine crystal before reacharging the battery. The pulse waveform is shown in FIG. 3(A), in which $i_p^- = 100$ mA/cm$^2$, $i_a = 10$ mA/cm$^2$, ON is 1 ms, and OFF is 10 ms. The electrically negative zinc electrodepositing pulse is applied to the negative electrode so that the pulse current flows from the positive electrode to the negative electrode through the positive and negative electrolytes. In FIG. 3(A), the fact that the pulse waveform is shown on the negative (−) side indicates that the pulse is applied to the negative electrode. The total pulse treatment time is about 30 min. After the above pulse treatment, a dc charging current is passed for 1.5 h for dc recharging.

Figure 4A:
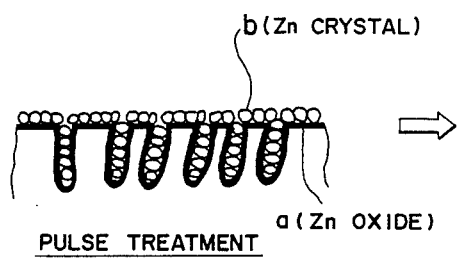
FIG. 4(A) is an enlarged cross-sectional model view showing a fine zinc crystal layer formed on the negative electrode when the electric pulse treatment is effected.
Figure 4B:
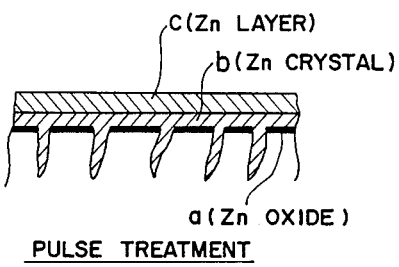
FIG. 4(B) is an enlarged cross-sectional model view showing the fine zinc crystal layer formed on the negative electrode by the electric pulse treatment according to the present invention and a zinc layer formed on the formed fine zinc crystal layer when the dc zinc electrodeposition process is effected on the basis of a conventional dc charging voltage.

The reason why the electrodepositing pulse can make the zinc crystal fine can be explained as follows: As depicted in FIG. 4(A), the surface of the negative electrode is covered by a porous zinc oxide layer a after discharge. Under these conditions, if the zinc electrodepositing pulse treatment is effected, an electrodeposited zinc layer b of minute crystal is formed uniformly on the porous zinc oxide layer a to reform the porous zinc oxide layer a as shown in FIG. 4(A). When a dc recharging current flows from the positive electrode to the negative electrode, a uniformly thick zinc deposition layer c can be formed on the uniformly fine reformed zinc crystal layer b in the succeeding dc recharging process without producing dendrite, as depicted in FIG. 4(B).

Figure 4C:
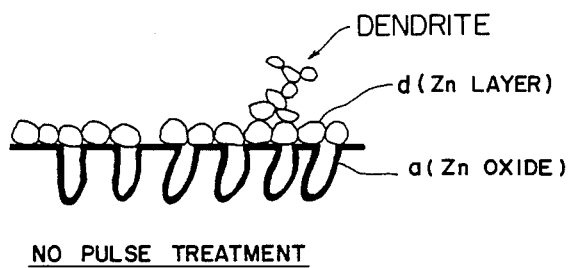
FIG. 4(C) is an enlarged cross-sectional model view showing a conventional zinc layer formed on the negative electrode when the dc zinc electrodeposition process is effected without pulse treatment.

In contrast with this, in the case where no pulse treatment is effected, a coarse zinc electrodeposited layer d is directly formed by the dc recharging process on the porous zinc oxide layer a as depicted in FIG. 4(C), so that zinc is non-uniformly deposited on the zinc oxide layer a, thus resulting in the dendrite structure. Once dendrite is formed, it is impossible to form thick zinc layer on the negative electrode.

The greater the current density of the electrodepositing pulse is, the greater will be the effect of zinc crystal fineness. Therefore, the pulse treatment is effected in high current density. However, the recharging process by a dc current is usually effected in low current density for prevention of dendrite. In the conventional method in which no pulse treatment is effected before the dc recharging process, there exists a tnedency to produce dendrite even if the battery is recharged by a dc current of low density. In the present invention, it is possible to deposite zinc without producing dendrite by applying a high current density pulse current, this may be due to the fact that the electrodepositing pulse has the off time duration.

Further, a pulse of high current density is effective for a porous zinc oxide layer. This is because fine zinc crystal can be deposited in the porous zinc oxide cavities and further the fine zinc crystal can better stick to the zinc oxide layer. The fact that the porous zinc oxide cavities are not filled with zinc crystal indicates that a low current density dc recharging current cannot fill the cavities with the zinc crystal in the conventional method in which no pulse treatment is effected.

To determine the electrodepositing pulse conditions, peak current density $i_p$, on time duration ON, off time duration OFF, and the total pulse treatment time T should be determined. These four pulse conditions will be described hereinbelow in further detail in order.

Peak Current density $i_p$:

In a $ZnBr_2$ aqueous solution, the Tafel's linearity is satisfied if $i_p$ is 80 mA/cm$^2$ or more. Under these conditions, since a great number of fine crystals develop and grow more readily as compared with the growth of crystal grain, this is preferable from the standpoint of fine crystal formation. Further, the charge transfer in the reaction $zn^{++} + 2e^- \rightarrow Zn$ is the rate-determining step (reaction fairly progresses) and additionally the most uniform electrodeposited layer can be obtained. Therefore, it is preferable to use the pulse with a current density of 80 mA/cm$^2$ or more. However, if the current density is excessively high, the pulse generating source may be excessively expensive.

Figure 5:
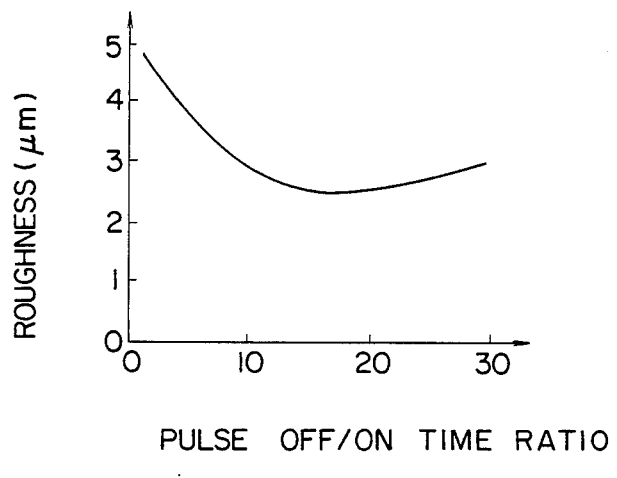
FIG. 5 is a graphical representation showing the relationship between the surface roughness of the negative electrode and the off-to-on time ratio of the fine crystal electrodepositing pulse or the oxide resolving pulse according to the present invention.

OFF-time and ON time:

The optimum ratio of off time to on time (OFF/ON) of the pulse changes according to the magnitude of the current density $i_p$. The relationship between the pulse OFF/ON ratio and the surface roughness ($\mu$) in electrodeposited zinc layer on the negative electrode at the peak current density $i_p$ of 100 mA/cm$^2$ (more than 80 mA/cm$^2$) is shown in FIG. 5. This graphical representation indicates that the surface roughness in electrodeposited zinc layer is the minimum when the OFF/ON ratio lies between 10 and 25. Here, it is possible to consider that the smaller the surface roughness is, the more uniform will be the electrodeposited zinc crystal layer. That is, the OFF/ON ratio of the pulse should preferably range from 10 to 25 for providing a better zinc oxide layer reforming effect. If this OFF/ON ratio increases, the average current density $i_a$ will be reduced, so that the necessary total pulse treatment time should be increased.

Total pulse treatment time:

Zinc fine crystal electrodepositing pulse:

When the total pulse treatment time is many hours of more than 60 minutes after discharge, slender and flat dendrite appears, because of the influence of the porous zinc oxide layer surface formed on the negative electrode at discharge. Therefore, the uniformity of deposited zinc crystal layer deteriorates in the succeeding dc recharging process. Further, if the total pulse treatment time is less than 30 minutes, it is impossible to form a sufficiently uniform zinc crystal layer on the porous zinc oxide formed on the negative electrode. Therefore, the total pulse treatment time lies preferably from 30 to 60 minutes.

(2) Zinc oxide resolving pulse:

This pulse is effective to eliminate the porous zinc oxide layer formed on the residual zinc surface of the negative electrode before recharging the battery by a dc current. This polishing pulse treatment serves to form the electrodepositing zinc uniform in the succeeding recharging process. This may be due to the fact that the porous zinc oxide layer is removed or made uniform by the high current density resolving pulse.

Figure 3B:
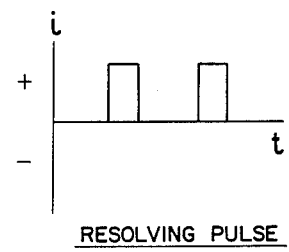
FIG. 3(B) is a graphical representation for assistance in explaining a zinc oxide resolving pulse (electrically positive pulse) adopted in the method according to the present invention.

The pulse waveform is shown in FIG. 3(B), in which $i_p+ = 100$ mA/cm$^2$, $i_a = 10$ mA/cm$^2$, On is 1 ms, and OFF is 10 ms. The electrically positive zinc oxide resolving pulse is applied to the negative electrode so that the pulse current flows from the negative electrode to the positive electrode through the negative and positive electrolytes. In FIG. 3(B), the fact that the pulse waveform is shown on the poisitive (+) side indicates that the pulse is applied to the negative electrode. The total pulse treatment time is about 5 minutes.

In this connection, in the case where the residual zinc on the negative electrode is resolved not by this pulse treatment but by a dc current treatment, since the zinc ion concentration in the negative electrolyte is not uniform at the zinc interfacial region between the diposited zinc and the negative electrolyte, the reaction speed of zinc resolving differs partially on the zinc layer deposited on the negative electrode, thus resulting in a coarse zinc layer. In addition, the accumulation of zinc ion at the interfacial regions readily produces the condition where the succeeding oxidizing reaction such as $Zn^{++} + 1/2XO_2 \rightarrow ZnOx$, $Zn^{++} + X(OH^- \rightarrow Zn(OH)x$, etc. is accelerated, thus readily producing a porous oxide layer.

(3) Zinc oxide resolving pulse and zinc fine crystal electrodepositing pulse in combination:

Since the resolving pulse treatment serves to polish the surface of the negative electrode, it is possible to more uniformly form a fine electrodeposited zinc crystal on the porous zinc oxide layer after the resolving pulse has been applied to the negative electrode. Therefore, the experiment has been made that the resolving pulse treatment is effected for 5 minutes before the electrodepositing pulse treatment is effected for 30 min and therefore the dc recharging process is achieved. The experiment results indicate that the zinc layer is deposited more uniformly as compared with the case where either of the electrodepositing pulse treatment or the resolving pulse treatment is only effected.

As described above, when the dc recharging process is achieved after the resolving pulse and the electrodepositing pulse have both been applied, since the porous zinc oxide layer can be polished and fine zinc crystal can be formed thereon more uniformly, it is possible to further improve the uniformity of the electrodepositing zinc layer by the succeeding dc recharging process. When the surface of the porous zinc oxide layer formed during discharge is reformed by these pulse treatments, it is possible to solve the basic cause of the occurrence of zinc dendrite.

Further, the effect of the zinc oxide resolving pulse is prominent when the magnitude of the peak current density $i_p{}^+$ is 80 mA/cm$^2$ or more and the total pulse duration time is from 5 to 10 min. This total time is shorter than that of the electrodepositing pulse.

(4) Alternating pulse

Figure 3C:
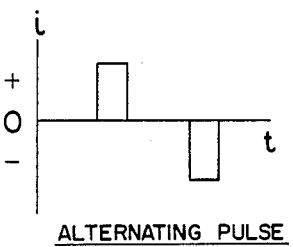
FIG. 3(C) is a graphical representation for assistance in explaining an alternating depositing/resolving pulse adopted in the method according to the present invention.

In the above three pulse treatments, the electrically negative or positive pulses are applied to the negative electrode so that the pulse current flows in a predetermined direction for a predetermined time period. Therefore, it is also possible to predict that an alternating pulse treatment as shown in FIG. 3(C) is more effective than the periodic pulse treatment as shown in FIG. 3(A) or (B).

Therefore, an experiment has been made under the conditions that $i_p{}^-$ (applied to the negative electrode) is 190 mA/cm$^2$ (ON time is 1 ms) and $i_p{}^+$ (applied to the negative electrode) is 100 mA/cm$^2$ (ON time is 1 ms); that is, $i_a = 40$ mA/cm$^2$. However, this experiment result has indicated that the effect is less than that in the already explained three pulse treatments (1) to (3).

2nd Embodiment

A battery stack of ten bipolar secondary cells has been manufactured, and the zinc oxide resolving pulse treatment and the zinc electrodepositing pulse treatment have been effected in combination after discharge but before recharge. The test conditions are as follows: The electrolyte includes 3 mol/$\lambda$ ZnBr$_2$, 2 mol/$\lambda$ supporting electrolyte (NH$_4$Cl), a zinc dendrite inhibitor (consisting of $1 \times 10^{-4}$ mol/$\lambda$ PbBr$_2$, $1 \times 10^{-4}$ mol/$\lambda$ SnBr$_2$ and $3 \times 10^{-3}$ mol/$\lambda$ trimethyl dodecyl ammonium bromide), and 1 mol/$\lambda$ bromine complexing agent (consisting of 0.5 mol/$\lambda$ methyl ethyl morpholinium bromide and 0.5 mol/$\lambda$ methyl ethyl pyrrolidinium bromide).

The current density is 20 mA/cm$^2$ in discharge and recharge processes. The zinc oxide resolving pulse is $i_p{}^+ = 100$ mA/cm$^2$, $i_a = 5$ mA/cm$^2$, OFF/ON time ratio = 20, and total time = 10 min. The zinc electrodepositing pulse is $i_p{}^- = 100$ mA/cm$^2$, 6.7 mA/cm$^2$, OFF/ON time ratio = 15, and total time = 30 min.

Figure 6A:
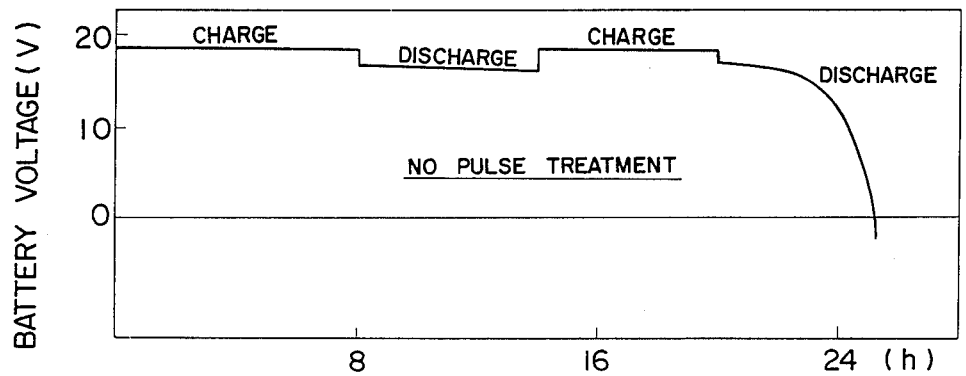
FIG. 6(A) is an exemplary graphical representation showing conventional charge/discharge voltage characteristics of the battery to which no pulse treatment is effected.
Figure 6B:
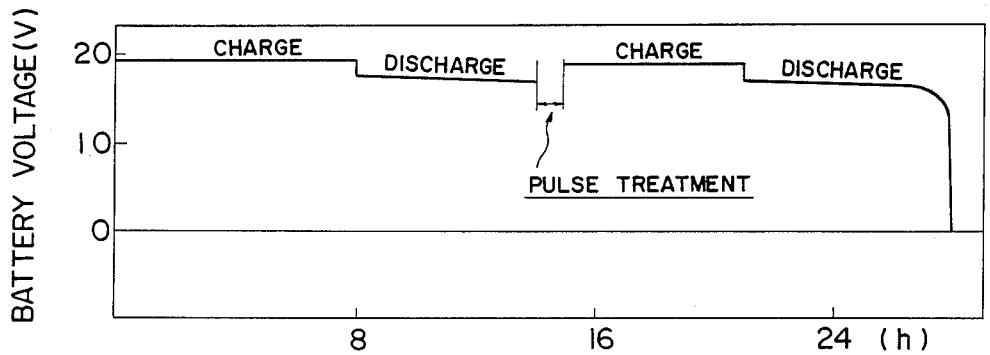
FIG. 6(B) is an exemplary graphical representation showing charge/discharge voltage characteristics of the battery to which the pulse treatment according to the present invention is effected.

FIG. 6(B) indicates the charge/discharge battery voltage characteristics obtained when the above two pulse treatments are effected, and FIG. 6(A) indicates those obtained when no pulse treatment is effected for comparison. The above two graphical representations clearly indicate that when the pulse treatments are effected, the battery can maintain a higher discharge voltage for a longer time in the repeated charge/discharge operation.

3rd Embodiment

The same discharging/recharging test as in the second embodiment has been conducted by changing only the zinc dendrite inhibitor. The used inhibitor consists of $1 \times 10^{-4}$ mol/$\lambda$ TlBr$_2$, $1 \times 10^{-3}$ mol/$\lambda$ InBr$_2$ and $3 \times 10^{-3}$ mol/$\lambda$ trimethyl decyl ammonium bromide. Further, the effect of dendrite inhibitor is prominent when the concentration of the above each metal ion is from $1 \times 10^{-5}$ to $1 \times 10^{-3}$ mol/$\lambda$ and that of the trimethyl decyl ammonium bromide is from $1 \times 10^{-5}$ to $1 \times 10^{-2}$ mol/$\lambda$.

The test results have been almost the same as those obtained in the second embodiment shown in FIG. 6(B).

As described above, in the method of operating a zinc-halogen secondary battery according to the present invention, sinc zinc oxide produced on the negative electrode during discharge can be removed by the resolving pulse treatment (an electrically positive pulse is applied to the negative electrode) and further since the fine zinc crystal layer can be formed on the negative electrode by the electrodepositing pulse treatment (an electrically negative pulse is applied to the negative electrode) both before dc recharging process, it is possible to form a uniformly thick zinc layer on the negative electrode in the dc recharging process without producing zinc dendrite.

Further, when the above pulse treatment is effected in an electrolyte including some dendrite inhibitor, it is possible to synergistically improve the efficiency of forming a thick zinc layer on the negative electrode in the succeeding dc recharging process.

What is claimed is:

1. A method of operating a zinc-halogen battery having a plurality of secondary cells, each cell comprising a zinc negative electrode, a halogen positive electrode, and an electrolyte therebetween, the method including the steps of:
    (a) charging the secondary cells by applying a direct current to the secondary cells for a first predetermined time;
    (b) after the step (a), discharging the secondary cells; and
    (c) before the step (a), applying a series of electric pulses to the negative electrodes of the respective secondary cells for a second predetermined time to prevent formation of zinc dendrites on the negative electrodes of the respective secondary cells, the second predetermined time being shorter than the first predetermined time.

2. The method as set forth in claim 1, wherein the step (c) includes the step of applying negative electric pulses to the negative electrodes of the respective secondary cells for the second predetermined time.

3. The method as set forth in claim 2, wherein the negative electric pulses have a current density equal to or greater than 80 mA/cm$^2$ and off-to-on ratio ranging from 10 to 25 and wherein the second predetermined time is in the range off from 30 to 60 minutes.

4. The method as set forth in claim 1, wherein the step (c) includes the step of applying positive electric pulses to the negative electrodes of the respective secondary cells for the second predetermined time.

5. The method as set forth in claim 4, wherein the positive electric pulses has a current density equal to or greater than 80 mA/cm$^2$ and an off-to-on time ratio ranging from 10 to 25, and wherein the second predetermined time is in a range of from 5 to 10 minutes.

6. The method as set forth in claim 1, wherein the step (c) includes the step of applying positive and negative electric pulses changing alternatively to the negative electrodes of the respective secondary cells for the second predetermined time.

7. The method as set forth in claim 1, wherein the step (c) includes the steps of (d) applying positive electric pulses to the negative electrodes of the respective secondary cells for a predetermined time, and (e) applying negative electric pulses to the negative electrodes of the respective secondary cells for a predetermined time after applying said positive electric pulses in accordance with step (d).

8. The method as set forth in claim 1, wherein the electrolyte includes a zinc dendrite inhibitor.

9. The method as set forth in claim 8, wherein the zinc dendrite inhibitor is one selected from a group consisting of $PbBr_2$, $SnBr_2$, and quaternary ammonium salt.

10. The method as set forth in claim 9, wherein the quaternary ammonium salt is trimethyl dodecyl ammonium bromide.

11. The method as set forth in claim 9, wherein the quaternary ammonium salt is trimethyl decyl ammonium bromide.

12. The method as set forth in claim 8, wherein the zinc dendrite inhibitor is one selected from a group consisting of $TlBr_2$, $InBr_2$ and quaternary ammonium salt.

* * * * *